United States Patent
Doshi et al.

(10) Patent No.: US 8,788,774 B2
(45) Date of Patent: *Jul. 22, 2014

(54) PROTECTING DATA DURING DIFFERENT CONNECTIVITY STATES

(71) Applicant: Microsoft Corporation, Redmond, WA (US)

(72) Inventors: Apurva Ashwin Doshi, Seattle, WA (US); Grigory Borisovich Lyakhovitskiy, Bothell, WA (US); Bohdan W. Raciborski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/094,552

(22) Filed: Dec. 2, 2013

(65) Prior Publication Data

US 2014/0095798 A1 Apr. 3, 2014

Related U.S. Application Data

(63) Continuation of application No. 12/973,902, filed on Dec. 21, 2010, now Pat. No. 8,627,025.

(51) Int. Cl.
*G06F 12/16* (2006.01)

(52) U.S. Cl.
USPC .................. 711/162; 711/163; 711/165

(58) Field of Classification Search
USPC .......................... 711/162, 163, 165
See application file for complete search history.

(56) References Cited

U.S. PATENT DOCUMENTS

| | | | | |
|---|---|---|---|---|
| 6,079,000 A * | 6/2000 | Cooper et al. | ................ | 711/162 |
| 7,162,587 B2 * | 1/2007 | Hiken et al. | .................. | 711/135 |
| 7,168,001 B2 * | 1/2007 | Johnson et al. | ................. | 714/13 |
| 8,219,759 B2 * | 7/2012 | Gokaraju et al. | ............. | 711/133 |
| 2004/0059870 A1 * | 3/2004 | Ash et al. | ...................... | 711/119 |
| 2004/0088508 A1 * | 5/2004 | Ballard et al. | ................ | 711/162 |
| 2005/0187891 A1 * | 8/2005 | Johnson et al. | .................. | 707/1 |
| 2008/0091895 A1 * | 4/2008 | Chen | ............................ | 711/162 |
| 2010/0280999 A1 * | 11/2010 | Atluri et al. | ................... | 707/657 |
| 2011/0010499 A1 * | 1/2011 | Tsukamoto et al. | .......... | 711/118 |
| 2011/0066805 A1 * | 3/2011 | Janschitz et al. | .............. | 711/115 |
| 2011/0246721 A1 * | 10/2011 | Crisan | .......................... | 711/130 |
| 2011/0264875 A1 * | 10/2011 | Watanabe | ..................... | 711/162 |
| 2012/0210084 A1 * | 8/2012 | Carroll et al. | ................. | 711/162 |

* cited by examiner

*Primary Examiner* — John Lane
(74) *Attorney, Agent, or Firm* — John Jardine; Andrew Sanders; Micky Minhas (57) ABSTRACT

Aspects of the subject matter described herein relate to data protection. In aspects, during a backup cycle, backup copies may be created for files that are new or that have changed since the last backup. If external backup storage is not available, the backup copies may be stored in a cache located on the primary storage. If backup storage is available, the backup copies may be stored in the backup storage device and backup copies that were previously stored in the primary storage may be copied to the backup storage. The availability of the backup storage may be detected and used to seamlessly switch between backing up files locally and remotely as availability of the backup storage changes.

20 Claims, 7 Drawing Sheets

PROTECTING DATA DURING DIFFERENT CONNECTIVITY STATES

RELATED APPLICATIONS

This application is a continuation of prior application Ser. No. 12/973,902, filed Dec. 21, 2010, which was pending and allowed at the time this application was filed. The aforementioned application is incorporated herein in its originally filed form.

BACKGROUND

Many people who use computers recognize the need to create backup copies of the data that is stored on the computers. Not only does computer hardware sometime fail, but sometimes files are overwritten or deleted on accident. Unfortunately, for various reasons, many of the people who recognize the need to create backup copies of their data do not actually protect their data through regular or even non-regular backups.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to data protection. In aspects, during a backup cycle, backup copies may be created for files that are new or that have changed since the last backup. If external backup storage is not available, the backup copies may be stored in a cache located on the primary storage. If backup storage is available, the backup copies may be stored in the backup storage device and backup copies that were previously stored in the primary storage may be copied to the backup storage. The availability of the backup storage may be detected and used to seamlessly switch between backing up files locally and remotely as availability of the backup storage changes.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first," "second," "third," and so forth are used. The use of these terms, particularly in the claims, is not intended to imply an ordering but is rather used for identification purposes. For example, the phrase "first version" and "second version" does not necessarily mean that the first version is the very first version or was created before the second version or even that the first version is requested or operated on before the second versions. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
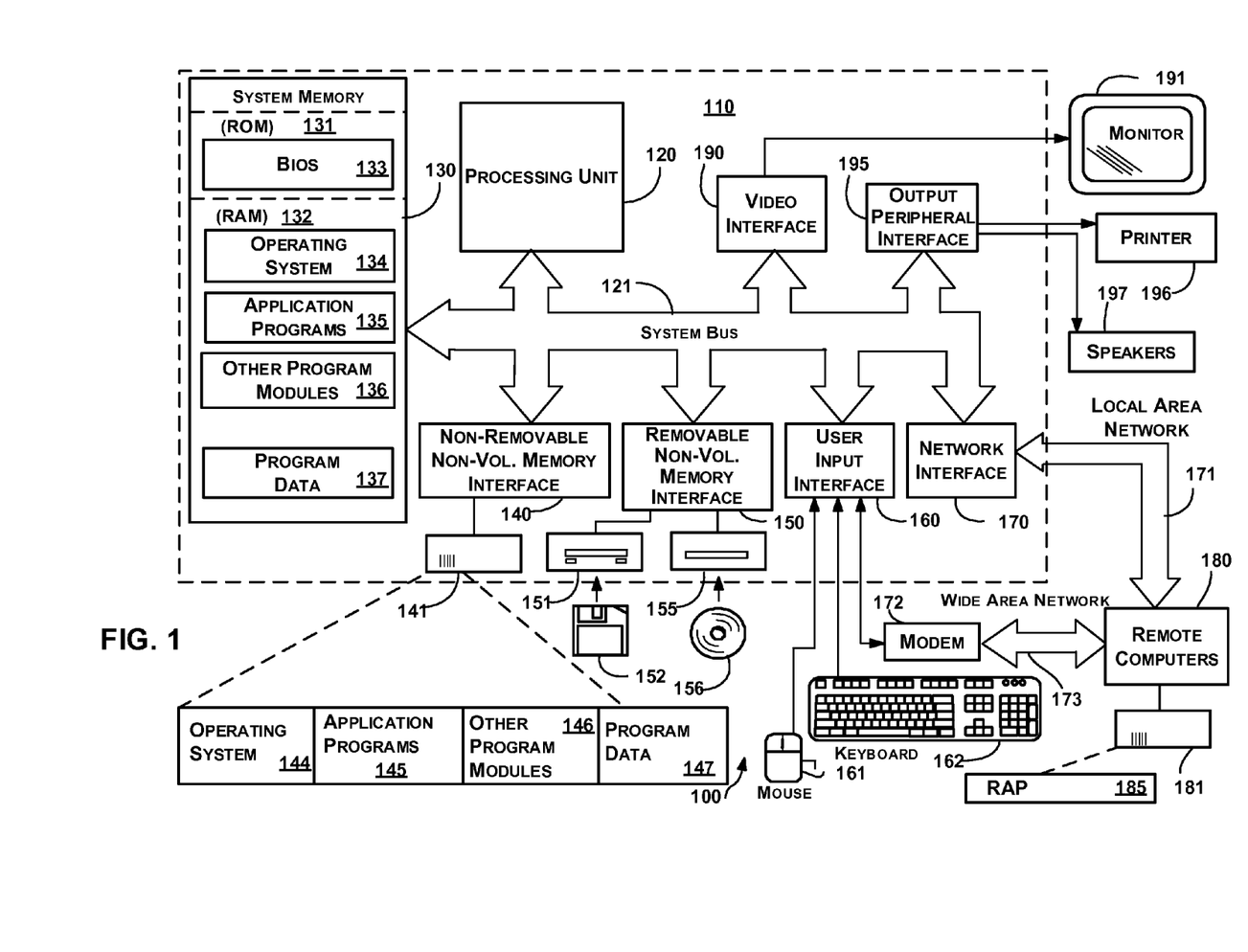
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable non-volatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Protecting Data

Figure 2:
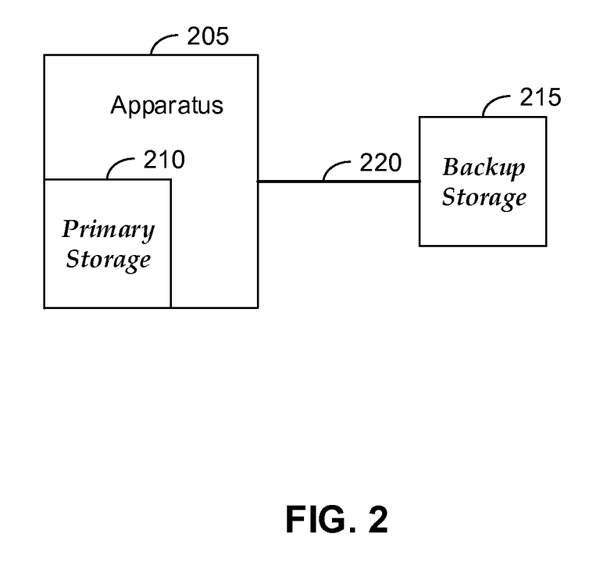
FIG. 2 is a block diagram that generally represents an exemplary environment in in which aspects of the subject matter described herein may be implemented.

As mentioned previously, people often neglect to create backup copies of their data. FIG. 2 is a block diagram that generally represents an exemplary environment in in which aspects of the subject matter described herein may be implemented. As illustrated, the environment includes an apparatus 205 that includes primary storage 210. The apparatus 205 is also connected to a backup storage 215.

The apparatus 205 may be implemented using one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as the apparatus 205 comprises the computer 110 of FIG. 1.

The primary storage 210 may include any storage media capable of storing data. The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like. The primary storage 210 may be implemented using the computer storage media described in conjunction with FIG. 1.

In one embodiment, the primary storage 210 may be internal to the apparatus 205. In this embodiment, the primary storage 210 may be attached to the apparatus 205 in various ways as will be appreciated by those skilled in the art. As one example, the primary storage 210 may comprise a hard disk that is attached to an internal structure of the apparatus 205.

In another embodiment, the primary storage 210 may be external, or include components that are both internal and external to the apparatus 205. For example, the primary storage may include a USB storage device, an iSCSI connected storage device, and the like.

The primary storage 210 may include one or more physical devices that are of the same or different types. The one or more physical devices may be formatted with a file system. The apparatus 205 may rely on the primary storage 210 as the default storage to store file system objects (hereinafter sometimes referred to as files).

The line 220 represents a connection from the apparatus 205 to the backup storage 215. The computer may be connected to the backup storage 215 in a variety of ways. For example, the computer may be connected to the backup storage 215 via direct wired media such as a USB cable, IEEE 1394 cable, fiber-optic cable, or other physical media, wireless media such as RF, infrared, and other wireless media, and the like. The line 220 may represent a network that includes servers, routers, switches, and other networking devices, and the like that logically connects the apparatus 205 to the backup storage 215.

The backup storage 215 may become available and unavailable to the apparatus 205 and may be susceptible to being connected and disconnected frequently from the apparatus 205. Furthermore, the backup storage 215 may change states between available and unavailable at predictable or unpredictable times—at least from the perspective of the apparatus 205.

When the apparatus 205 detects that the backup storage 215 is available (e.g., the backup storage 215 has been connected to the computer, turned on, or otherwise made available), the apparatus 205 may seek to backup files that are stored on the primary storage 210 to the backup storage 215.

Because the backup storage 215 may be disconnected or otherwise made unavailable to the apparatus 205 at any time, the apparatus 205 may include logic and maintain data to track progress of creating backup copies of files of the primary storage 210 to the backup storage 215.

In addition, the apparatus 205 may also maintain a backup copy of files, including those that have been added or changed since last backup, on the primary storage 210 itself. Added may include added to a protected namespace (e.g., adding a file to a directory that is configured for backup), added by changing the protected namespace to include the file (e.g., changing the directories to be backed up), and the like. As used herein, the term changed is meant to include files that have been added or files that have been changed. For example, while the backup storage 215 is unavailable, a data protection engine executing on the apparatus 205 may periodically create copies of files that have changed on the primary storage 210 and store these copies in a designated location on the primary storage 210. This designated location is sometimes referred to as a cache. Later, when the backup storage 215 becomes available, the data protection engine may copy the backup copies from the primary storage 210 to the backup storage 215.

If the backup storage 215 becomes unavailable while the computer is copying a file to the backup storage 215, the apparatus 205 may maintain data that indicates that the file was not successfully copied, data that indicates how much of the file was copied to the backup storage, or other data indicative of the status of copying the file to the backup storage 215.

In particular, for each file that needs to be backed up the backup storage 215, backup data may be maintained that indicates one of three states: not started, in progress (i.e., copied to cache), and processed (e.g., copied to backup storage). Not started indicates that the file has been marked as needing to be backed up, but that creating a backup copy of the file has not completed and perhaps not even started to either the cache of the primary storage 210 or the backup storage 215. Sometimes as used herein not started is referred to as not completely copied. In progress means that a copy of the file has been created and stored on the cache of the primary storage 210, but that the file has not been completely copied to the backup storage 215. Processed means that a backup copy of the file has been stored on the backup storage 215.

A file may go from the not started state to the in progress state or the processed state, depending on whether the backup storage 215 is available or unavailable. In one embodiment, if the backup storage 215 is available, a copy of the file may store on the backup storage 215 without creating a copy of the file for storage on the cache of the primary storage 210. In another embodiment, a copy of the file may be stored both on the backup storage 215 and in the cache even if the backup storage 215 is available at the time the copy is made.

After a file goes to the in progress state, the file may go to the processed state after the backup storage 215 becomes available and the file is copied from the cache to the backup storage 215.

Figure 3:
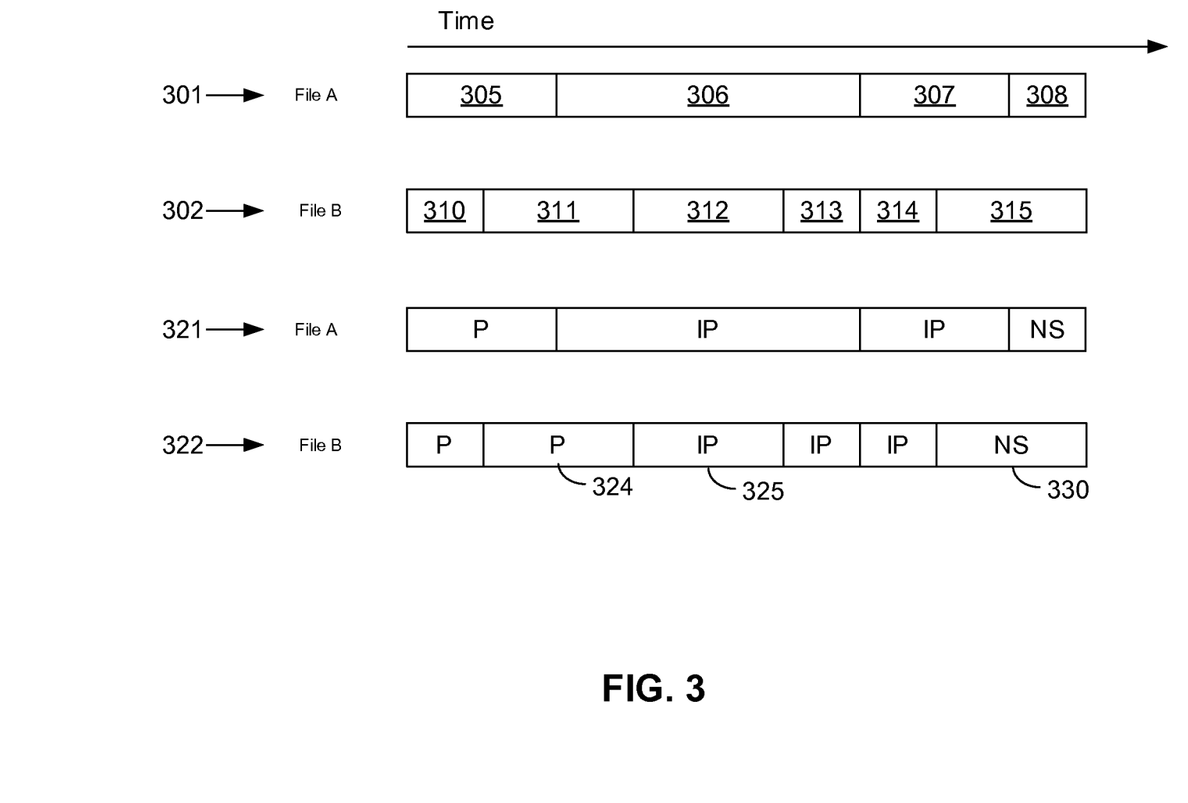
FIG. 3 is a block diagram that illustrates versions of and other data related to two exemplary files that may be backed up in accordance with aspects of the subject matter described herein.

FIG. 3 is a block diagram that illustrates versions of and other data related to two exemplary files that may be backed up in accordance with aspects of the subject matter described herein. As illustrated, there are files 301 and 302. File 301 has versions 305-308 while file 302 has version 310-315. The versions 305-308 and 310-315 represent different versions of the files 301-302, respectively, as the versions existed at certain times. The data 321 and 322 represents backup state that may be stored regarding the files 301 and 302, respectively.

In operation, only the last version of a file may be in the not started state. For example, the last version 308 of the file 301 may be in the not started state while the last version 315 of the file 302 may be in the not started state. The last version of a file is not required to be in the not started state and may be in the in progress state or the processed state.

Various updates may occur to the data 321 and 322 depending on what happens while attempting to backup versions of files. For example, if a file is in the not started state and a data protection engine attempts to backup the file and the file changes during the backup attempt, the version may be remarked as not started. In addition, updates to namespace records may occur as will be explained in more detail below.

In backup data for a file, there may be one or more versions that are marked as processed as well as one or more versions that are marked as in process. An exemplary representation of this data is illustrated by data 321 and 322, where P stands for processed, IP stands for in progress, and NS stands for not started.

Returning to FIG. 2, the apparatus 205 may include hardware and/or software that detects when the state of availability changes for the backup storage 215. When the state changes, the data protection engine may be informed or otherwise become aware of the state change and may take actions to seamlessly continue protecting changed files by copying the files to a designated portion of the primary storage 210 or the backup storage 215. For example, if the backup storage 215 becomes unavailable while the data protection engine is copying a file from the primary storage 210 to the backup storage 215, the data protection engine may copy the file to a cache on the primary storage 210 and may subsequently copy other files that change to the cache on the primary storage 210 until the backup storage 215 again becomes available.

Likewise, if the backup storage 215 becomes available while the data protection engine is copying files from the primary storage 210 to a cache in the primary storage 210, the data protection engine may start copying changed files from the primary storage 210 to the backup storage 215 and may also copy files from the cache in the primary storage 210 to the backup storage 215.

The term cache as used herein means a portion of the primary storage 210 that is reserved or used to store backup copies of files. The cache may be located in a directory or may be spread throughout the file system of the primary storage 210. The cache may be expandable, shrinkable, or fixed in size and may be dependent on a total size of the primary storage 210.

When the backup storage 215 is not available, backup copies of files may be copied to a cache in the primary storage 210. Once a version of a file is successfully copied to the cache, the state of the version may be marked as in progress.

That backup storage 215 may be treated as unavailable for a given file if it does not include enough free space to store a backup copy of a file that needs to be backed up. In that case, the file may be copied to the cache in the primary storage 210. Once space becomes available on the backup storage 215 or a different backup storage device is connected, the file may then be copied to the backup storage. When it is connected to the apparatus 205, the backup storage 215 may treated as available for files that are small enough to fit in the free space of the backup storage 215 while at the same time being treated as unavailable for files that are not small enough to fit in the free space.

If the cache gets full, various actions may be taken to protect files that have changed on the primary storage 210. In one embodiment, a configurable number of the most recent files are protected. For example, referring to FIG. 3, if there is not enough space on the cache for version associated with record 330 of the file 302, the backup copy for the in progress copy of the file associated with the record 325 may be deleted from the cache to make room for another copy of the file 302 to be stored on the cache.

In some cases when seeking to free space in the cache, an old version may be selected from a different file than the one for which a backup copy is needed. For example, referring to FIG. 3, if space is needed in the cache to backup a version of the file 301, the space freed from the cache may come from deleting one or more versions associated with the file 302 or other files. In one embodiment, the one or more versions may be selected based on age because they are the oldest versions stored in the cache.

In addition to deleting a version of a file from the cache, a namespace record may be modified to accommodate the deletion of this version from the cache. To track a namespace for versions of files over time, a catalog may be maintained as disclosed in a United States Patent Application entitled "FILE SYSTEM BACKUP USING CHANGE JOURNAL," filed Dec. 3, 2010, having Ser. No. 12/959,401, which application is assigned to the assignee of this patent application and hereby incorporated by reference. This catalog may be updated by 1) removing a namespace record for each version that is deleted from the cache and 2) potentially updating a remaining namespace record to account for the change in time covered by a version associated with the namespace record.

Figure 4:
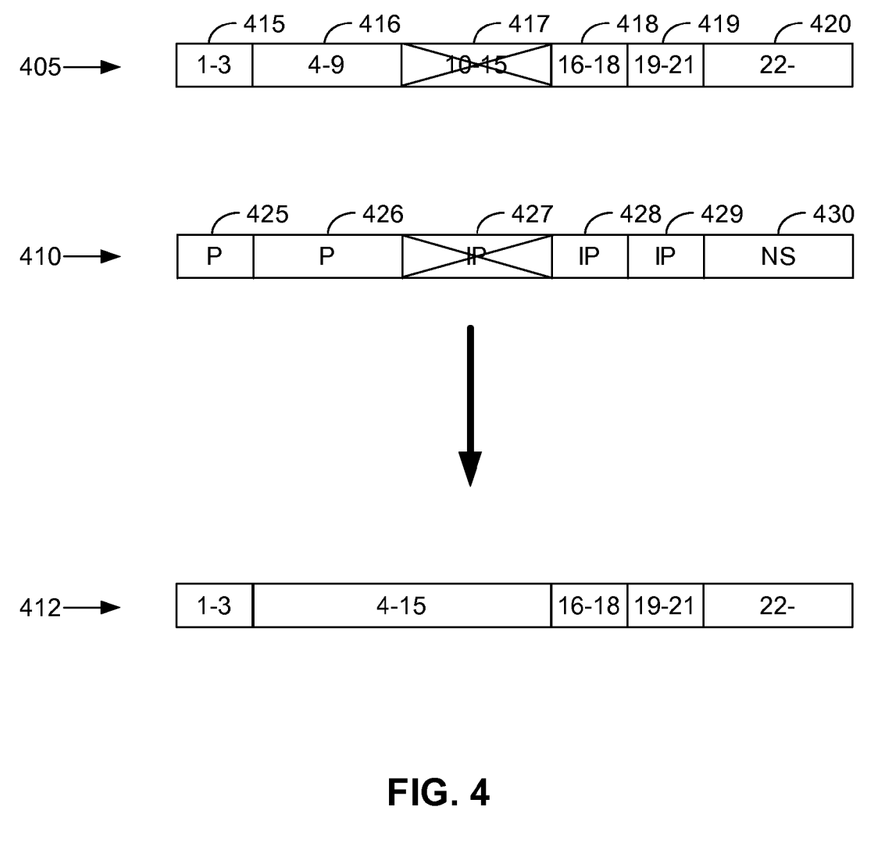
FIG. 4 is a block diagram that generally represents actions that may occur in freeing space in a cache in accordance with aspects of the subject matter described herein.

FIG. 4 is a block diagram that generally represents actions that may occur in freeing space in a cache in accordance with aspects of the subject matter described herein. The data 410 includes backup data for versions of a file. The data 405 includes namespace data associated with the records of the data 410. In particular, the namespace records 415-420 are associated with the versions 425-430 of the file 410 and indicate that the version 425 existed from time 1-3, the version 426 existed from time 4-9, the version 427 existed from time 10-15, the version 428 existed from time 16-18, and version 429 existed from time 19-21, and the version 420 existed from time 22 onward.

After deleting the version 427 and its associated namespace record 417, the namespace record 416 may be changed to indicate an end time of the version 427 as illustrated by the data 412. If the namespace record associated with the record 324 is the last in the lineage for a file (e.g., the file was deleted and a new file having the same name was created), the namespace record for the previous version may not be changed to have an end time of the deleted namespace record.

If a version is deleted from the cache for an in progress record that is the last record for the file, the state of the backup for the last record may be changed from in progress to not started. The last record may also be flagged to indicate that the file is not to be backed up into the cache unless the file changes again.

It is possible that an in progress record that is about to be deleted is associated with a file that has partially been copied to the backup storage 215 already. If the backup storage 215 is not available at the time of deletion, the file record may not be deleted completely. Instead, the file record may be marked with a "to be deleted" flag. Once the backup storage 215 becomes available again and the data protection engine is able to delete the partial copy of the file, the file record may then be deleted completely. In one implementation, the data protection engine may process files marked with the "to be deleted" flag before backing up files to the backup storage 215. Namespace changes described previously may be performed immediately, even if the backup storage 215 is not available at the moment.

Figure 5:
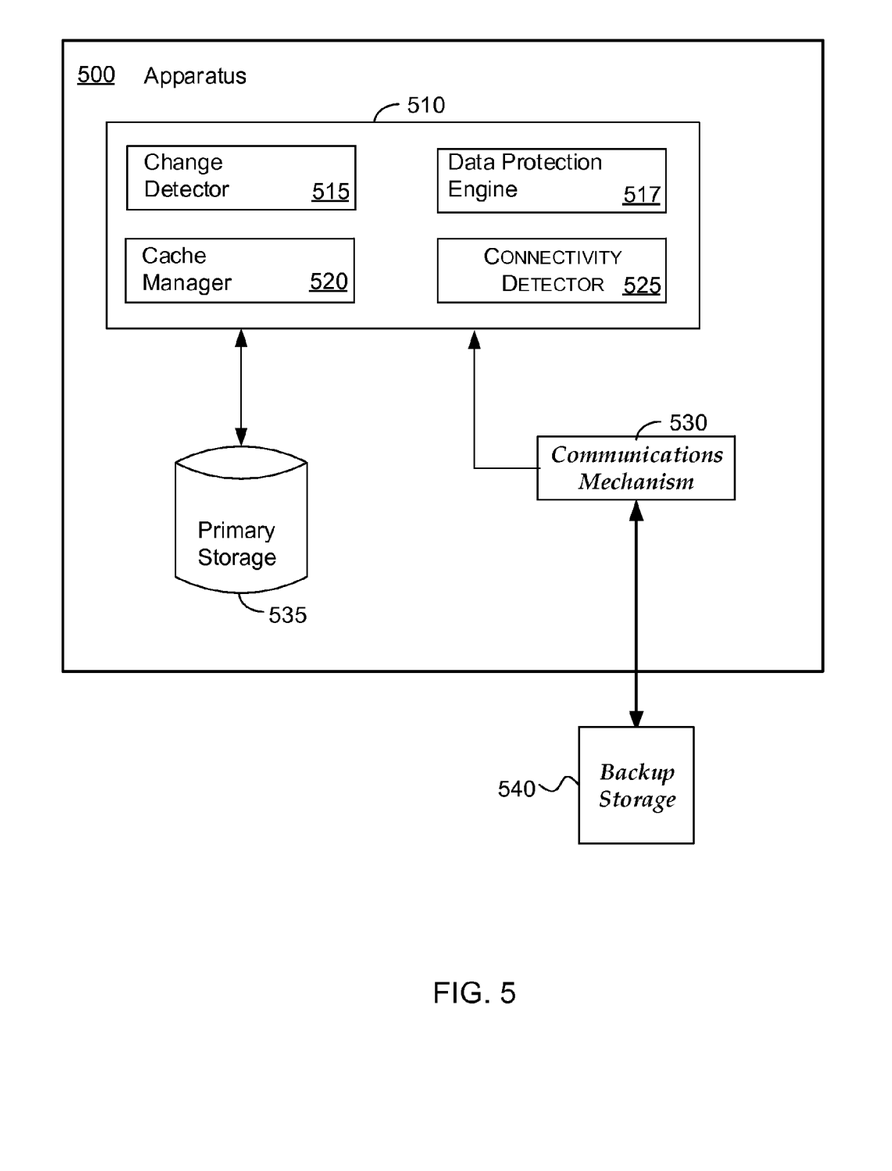
FIG. 5 is a block diagram that represents a system configured in accordance with aspects of the subject matter described herein.

FIG. 5 is a block diagram that represents a system configured in accordance with aspects of the subject matter described herein. The components illustrated in FIG. 5 are exemplary and are not meant to be all-inclusive of components that may be needed or included. In other embodiments, the components described in conjunction with FIG. 5 may be included in other components (shown or not shown) or placed in subcomponents without departing from the spirit or scope of aspects of the subject matter described herein. In some embodiments, the components and/or functions described in conjunction with FIG. 5 may be distributed across multiple devices.

Turning to FIG. 5, the apparatus 500 may include data protection components 510, a store 535, a communications mechanism 530, and other components (not shown). The apparatus 500 corresponds to the apparatus 205 and may be implemented as the apparatus 205 may be implemented.

The communications mechanism 530 allows the apparatus 500 to communicate with other entities. For example, the communications mechanism 530 may allow the apparatus to communicate with one or more devices (e.g., network attached storage, a storage area network device, a file server, or the like) that store backup copies of files included on the primary storage 535. The communications mechanism 530 may be a network interface or adapter 170, modem 172, USB or other port, or any other mechanism for establishing communications as described in conjunction with FIG. 1.

The primary storage 535 is any storage media capable of storing data including files of the apparatus 500. The primary storage 535 may be implemented with a file system, database, volatile memory such as RAM, other storage, some combination of the above, and the like and may be distributed across multiple devices. The primary storage 535 may be external, internal, or include components that are both internal and external to the apparatus 500. The primary storage 535 may operate similar to the primary storage 210 of FIG. 2.

The backup storage 540 also includes any storage media capable of storing data. The backup storage 540 is external to the apparatus 500 and may be stand alone or implemented on a server. The backup storage 540 may be implemented using a file system, database, nonvolatile memory, volatile memory such as RAM, other storage, some combination of the above, and the like and may be distributed across multiple devices. The backup storage 540 may operate similar to the backup storage 210 of FIG. 2.

The data protection components 510 may include a change detector 515, a cache manager 520, a data protection engine 517, a connectivity detector 525, and other components (not shown). As used herein, the term component is to be read to include hardware such as all or a portion of a device, a collection of one or more software modules or portions thereof, some combination of one or more software modules or portions thereof and one or more devices or portions thereof, and the like.

The connectivity detector 525 may be operable to determine the availability of the backup storage 540 as availability has been described in conjunction with FIG. 2.

The change detector 515 is a component that detects whether changes have occurred to files of a protected namespace. For example, the change detector 515 may use timestamps, may monitor changes made to the file system, or may use other mechanisms to determine whether changes have occurred. Based on the teachings herein, those skilled in the art may recognize other ways for detecting whether changes have occurred to files that may be used without departing from the spirit or scope of aspects of the subject matter described herein.

When the change detector 515 determines that a file has changed, the change detector 515 may communicate with the data protection engine 517 to indicate the file has changed. In response, the data protection engine 517 may undertake actions to back up the file (and other files that have changed) to the primary storage 535 or the backup storage 540. For example, the data protection engine may perform actions including:

1. If the backup storage 540 is available, copying a file to the backup storage 540; and
2. If the backup storage 540 is not available, copying the file to the cache via the cache manager 520.

Under the direction of the data protection engine 517, the cache manager 520 may operate to store, in a cache, backup copies of versions of the files located on the primary storage 535. The cache manager 520 may be further operable to delete versions of files in the cache to make additional free space available in the cache for storing recent versions of files.

In conjunction with deleting files in the cache via the cache manager 520, the data protection engine 517 may be further operable to update a data structure (e.g., such as a catalog) to delete records (e.g., a namespace record and a file record) associated with a deleted version of a file. The data protection engine 517 may also update another record (e.g., a previous namespace record) associated with a second version of the file to indicate that the second version has an ending time of the deleted version as mentioned previously in conjunction with FIGS. 2-4.

The data protection engine 517 may also maintain state of copying the files to storage as mentioned previously where the state includes: not started, copied to cache, and copied to second storage.

Figure 6:
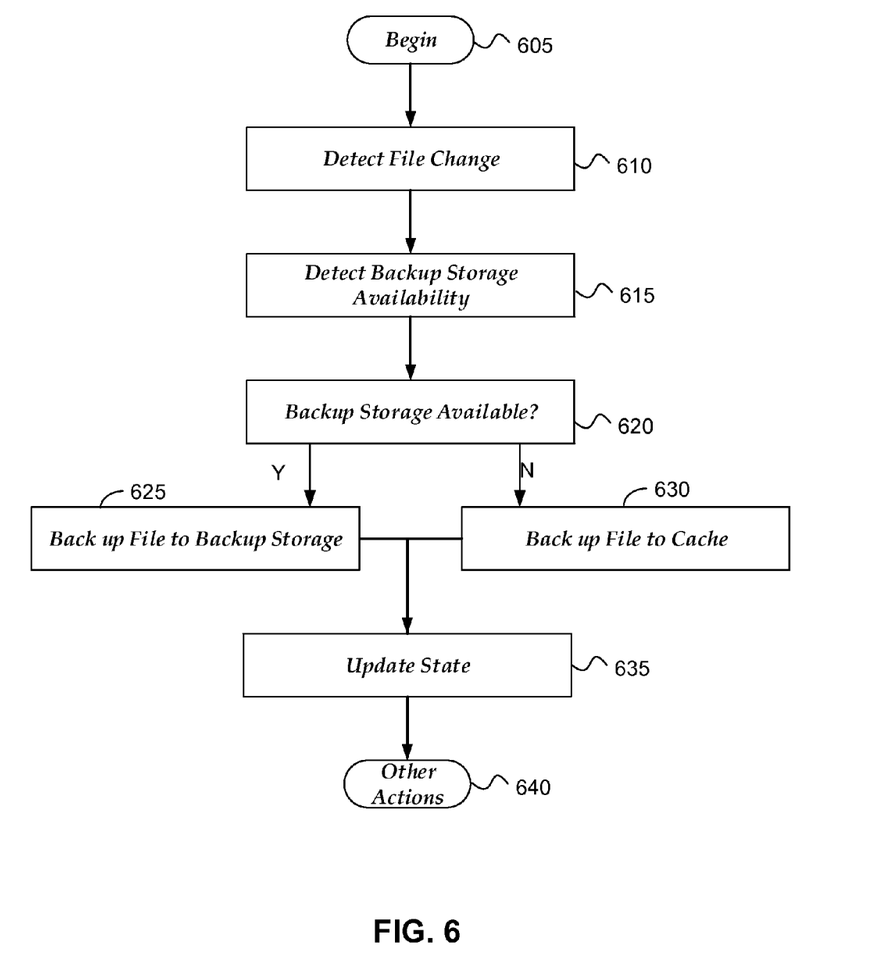
FIGS. 6-7 are flow diagrams that generally represent exemplary actions that may occur in accordance with aspects of the subject matter described herein.
Figure 7:
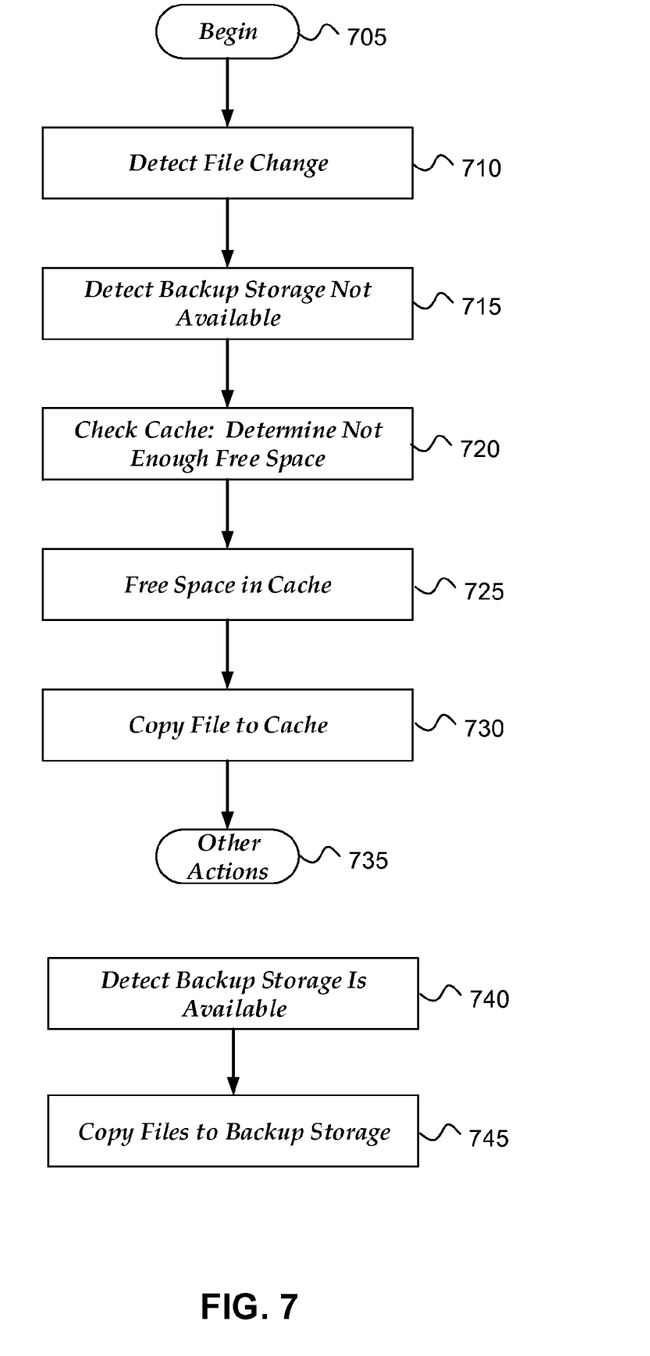

FIGS. 6-7 are flow diagrams that generally represent exemplary actions that may occur in accordance with aspects of the subject matter described herein. For simplicity of explanation, the methodology described in conjunction with FIGS. 6-7 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 6, at block 605, the actions begin. At block 610, a determination is made that a file has changed and needs to be backed up. For example, referring to FIG. 5, the change detector 515 may detect that a change has occurred to a file on the primary storage 535.

At block 615, backup storage availability may be detected. For example, referring to FIG. 5, the connectivity detector 525 may receive notification from an operating system (OS) component, may poll an OS or other component, may inspect data structures that indicate connectivity, may attempt to communicate with the backup storage, or may take other actions or the like to detect whether the backup storage 540 is available to the apparatus 500. Detecting that the backup storage 540 is available may include determining that the backup storage 540 has been directly connected via a wired or wireless media or detecting that backup storage 540 is reachable via a network connected to the apparatus 500. Detecting whether the backup storage 540 is available may also involve checking free space on the backup storage 540 as described previously. If the free space is less than the size of the file, it may be determined that the backup storage 540 is not available.

At block 620, if the backup storage is available, the actions continue at block 625; otherwise, the actions continue at block 630.

At block 625, the file is copied to the backup storage. For example, referring to FIG. 5, the data protection engine 517 may attempt to copy a file from the primary storage 535 to the backup storage 540. If the attempt is successful, the actions continue at block 635; otherwise, the actions may continue at block 640.

At block 630, the file is copied to the cache of the primary storage. For example, referring to FIG. 5, the data protection engine 517 may attempt to copy a file from the primary storage 535 to cache on the primary storage 535.

Before copying the file to the cache, a check may be performed to determine if the cache has enough free space in which to copy the file. If not, space may be freed in the cache previously prior to copying the file to the cache. This may involve deleting a first namespace record and a file record associated with a version that is being deleted and updating a second namespace record to have an ending time of the first namespace record as mentioned previously.

If the attempt to copy the file to the cache successful, the actions continue at block 635; otherwise, the actions may continue at block 640.

At block 635, state and other information (e.g., a catalog that includes a namespace) of the backup operation may be updated. For example, referring to FIG. 5, the data protection engine 517 may update the state of the backup from not started to in progress if the file was copied to the cache or to processed if the file was copied to the backup storage 540. Updating the other information may include updating a data structure to indicate whether the file has been copied to the cache, the backup storage, or both the cache and the backup storage.

If at any time the availability of the backup storage changes state, subsequent backup operations may proceed accordingly. For example, if the backup storage state changes from being available to no longer available, this may be detected (e.g., through a failure of a file operation, through notification of state change, or the like), and the file may then be copied to the cache. Likewise, if the backup storage state changes from unavailable to available, files may begin being copied from the primary storage 535 to the backup storage 540.

In some implementations, a data protection engine may have time constraints for copying files to the backup storage. For example, the data protection engine may be given a certain amount of time to backup changed files to the backup storage. As another example, a computer hosting the data protection engine may notify the data protection engine of a pending shutdown (e.g., a user may shut a laptop lid). Based on these time constraints, the data protection engine may stop the copying operation of a file while maintaining an indication that the file still needs to be copied. Maintaining an indication may include leaving the state of the file (e.g., not started or in progress) unchanged. When another backup cycle is started, the data protection engine may resume copying one or more portions of the file that were not copied in the previous backup cycle to the cache or second storage.

At block 640, other actions, if any, may be performed.

Turning to FIG. 7 at block 705, the actions begin. At block 710, a file change is detected. For example, referring to FIG. 5, the change detector 515 may detect that a change has occurred to a file on the primary storage 535.

At block 715, the second storage may be detected at not available. For example, referring to FIG. 5, the connectivity detector 525 may detect that the backup storage is not connected to the apparatus 500.

At block 720, the cache is checked to determine whether the cache has sufficient free space to store a copy of the file. For example, the data protection engine 517 may employ the cache manager 520 to check the free space of the cache stored on the primary storage 535. For example, the cache may not have sufficient free space to store a copy of the file.

At block 725, space in the cache is freed to make room for copying the file. For example, employing the cache manager 520, the data protection engine 517 may delete previous versions of files and update data structures as previously indicated.

At block 730, the file may be copied to the cache. For example, referring to FIG. 5, the data protection engine 517 may employ the cache manager 520 to copy a file from the primary storage 535 to the cache.

If during a backup cycle, the backup storage is detected as available, files from the cache may be copied from the cache to the backup storage as indicated in block 740. For example, referring to FIG. 5, the data protection engine 517 may receive notification from the connectivity detector 525 that the backup storage 540 is available.

At block 745, in response to the indication of availability above, files may be copied from the cache to the backup storage. For example, referring to FIG. 5, after receiving an indication that the backup storage 540 is available, the data protection engine 517 may start copying files from the cache to the backup storage 540.

In addition if a time constraint dictates that the backup cycle end, the data protection engine may stop the copying of files and may maintain data structures that indicate the files that still need to be backed up as well as the portions of the files that need to be backed up for files that were only partially copied.

At block 730, other actions, if any, may be performed.

As can be seen from the foregoing detailed description, aspects have been described related to data protection. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

The invention claimed is:

1. A method implemented at least in part by a computer, the computer comprising a cache storage and a primary storage device, the computer further comprising an interface providing potentially intermittent connectivity to a backup storage device on the network, the method comprising:
    performing first and second backup cycles to backup the primary storage device, the first and second backup cycles for backing up target files on the primary storage device, the first and second backup cycles comprising:
        monitoring for availability of the backup storage device to detect when the backup storage device becomes available and to detect when the backup storage device becomes unavailable;
        when copying a first portion of the target files from the primary storage device to the backup storage device and the monitoring indicates that the backup storage device has become unavailable, copying the first portion of the target files to a cache on the primary storage device and updating status information indicating that the first portion of the target files are in the process of being backed up; and
        when a second portion of the target files are to be copied from the primary storage device to the cache and the monitoring indicates that the backup storage device has become available: initiating copying of the first portion of the target files from the cache to the backup storage, initiating copying of the second portion of the target files from the primary storage device to the backup storage device, and updating the status information to indicate which files have been backed up.

2. A method according to claim 1, wherein monitoring for availability comprises obtaining an indication of current or expected free space on the backup storage device and, if the indication indicates that free space is or will be less than a size, then determining that the backup storage is not available.

3. A method according to claim 1, further comprising freeing space in the cache prior to copying a file to the cache.

4. A method according to claim 3, wherein freeing space in the cache comprises deleting a first namespace record and a file record and updating a second namespace record to have an ending time of the first namespace record.

5. A method according to claim 1, further comprising updating the status information to indicate whether a target file has been copied to the cache, the backup storage device, or to both the cache and the backup storage device.

6. A method according to claim 1, further comprising stopping a copying operation of a target file, maintaining an indication that the target file or a portion thereof still needs to be copied, and upon another backup cycle copying the file or the portion thereof to the cache or backup storage device.

7. A method of backing up a primary storage device for a computing device, the method comprising:
    executing a backup engine that backs files on the primary storage device up to a backup device, the primary storage device comprising a cache, and for a backup comprising one or more backup cycles the backup engine:
        tracks backup statuses of respective target files on the primary storage as either incomplete, in-progress, or complete;
        each time there is a determination that the backup device has become available, responds by: initiating copying of any target files in the cache to the backup device and changing corresponding statuses to indicate completion as such target files finish being copied to the backup device, and by initiating copying target files from the primary storage device to the backup device and changing corresponding statuses to indicate completion as such target files finish being copied to the backup device; and
        each time there is a determination that the backup device has become unavailable: stopping copying any target files in the cache to the backup device and leaving the corresponding statuses indicating in-progress, stopping copying target files from the primary storage device to the backup device, and initiating copying target files from the primary storage device to the cache and changing the corresponding statuses to indicate in-progress.

8. A method according to claim 7, wherein the backup device is connected via a network with the computing device, the method further comprising making determinations of whether the backup device is available by monitoring network connectivity with the backup device.

9. A method according to claim 7, wherein the backup period encompasses only one backup cycle.

10. A method according to claim 7, wherein the primary storage device is connected with the computing device via a bus of the computing device.

11. A method according to claim 7, further comprising detecting file changes to identify the target files for backup.

12. A method according to claim 7, further comprising deleting in the cache a first version of a target file, and updating a data structure to delete records associated with the first version and updating another record associated with a previous version of the target file to indicate that the previous version has an ending time of the first version.

13. A method according to claim 7, further comprising indicating a state of copying a target file, the state able to be updated to any of: not completely copied to cache or second storage, copied to cache, and copied to second storage.

14. A method of performing backing up a primary storage device of a computing device, the method comprising:
    monitoring for availability of a backup device during a first and second backup cycle;
    during the first backup cycle, when the backup device becomes unavailable, diverting first backup copies to a cache;

beginning the second backup cycle while the backup device is unavailable and responsive to determining that the backup device is unavailable diverting second backup copies to the cache; and during or after the second backup cycle, when the backup device is determined to be available, copying the first and second backup copies from the cache to the backup device.

15. A method according to claim 14, wherein the backup device is connected with the computing device via a network.

16. A method according to claim 15, wherein at least part of the network comprises the Internet.

17. A method according to claim 14, further comprising monitoring for available space for the cache and automatically freeing space for the cache responsive to a determination that insufficient space is available.

18. A method according to claim 14, further comprising tracking statuses of respective target files to be backed up and updating the statuses according to where the corresponding target files have been backed up to and/or according to whether corresponding target files are in progress of being backed up.

19. A method according to claim 18, wherein a status, at any one time, must have a status indicating either: that a corresponding target file is being copied, a corresponding target file has been backed up to the cache, or a corresponding target file has been backed up to the backup device.

20. A method according to claim 14, further comprising providing the cache on the primary storage device.

\* \* \* \* \*